Jan. 25, 1927.
F. J. LAHER
1,615,333
AUTOMOBILE BUMPER
Filed Feb. 23, 1926
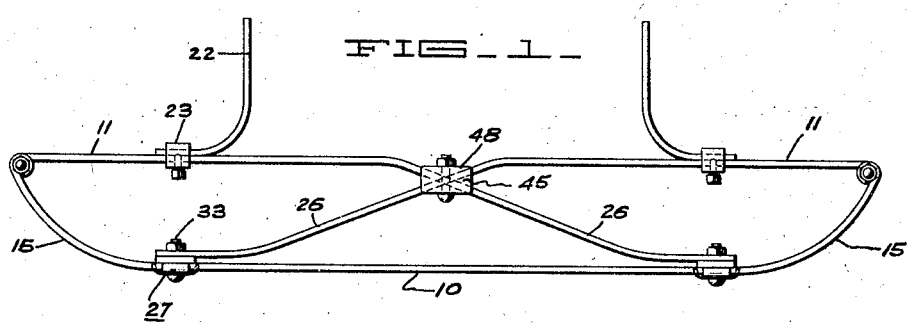
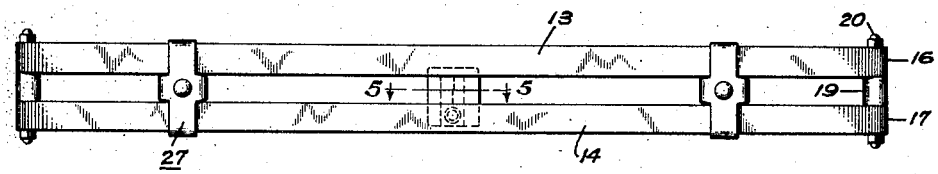
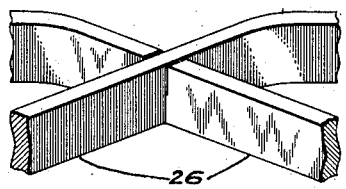  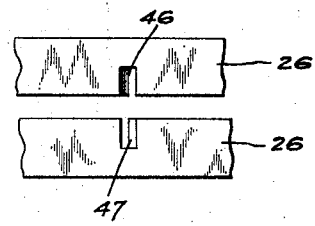
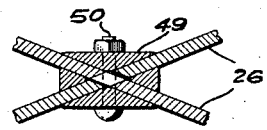
INVENTOR
Frank J. Laher
BY
ATTORNEYS Patented Jan. 25, 1927.

1,615,333

UNITED STATES PATENT OFFICE.

FRANK J. LAHER, OF OAKLAND, CALIFORNIA.

AUTOMOBILE BUMPER.

Application filed February 23, 1926. Serial No. 90,005.

This invention relates generally to bumpers such as are commonly used on automobiles or other vehicles.

The usual type of automobile bumper employs an impact member comprising one or more parallel impact bars which are mounted on one or more support bars so as to permit a certain amount of "give" to absorb the energy of impacts. When the impact bars are connected adjacent their ends to the support bar, it is preferable to reinforce their intermediate portions in some suitable manner.

It is an object of this invention to devise a novel form of reinforcement for the intermediate portion of the impact member of an automobile bumper.

It is a further object of this invention to devise a bumper in which the impact member will be properly reinforced but may be made of relatively light material and still have sufficient strength and resilience to withstand heavy impacts.

It is a further object of this invention to devise an automobile bumper which will be pleasing in appearance, simple in construction and cheap to manufacture.

Further objects of the invention will appear from the following description in which the preferred embodiment of the invention has been set forth.

Referring to the drawings:

Figure 1 is a plan view of a bumper incorporating the principles of this invention.

Fig. 2 is a front elevational view of the bumper shown in Fig. 1.

Fig. 3 is a detail view showing the manner of interlocking the reinforcing or truss bars.

Fig. 4 is a detail view showing the manner in which the reinforcing bars are locked.

Fig. 5 is a detail cross sectional view taken along the line 5—5 of Fig. 2.

The invention consists generally of impact and support members, the support member being formed in such a manner as to reinforce the intermediate portion of the impact member. Thus as shown in the drawing the impact member, designated generally at 10, is adapted to be operatively positioned upon an automobile or other vehicle by means of the support members 11. In the particular form of bumper shown the impact member is formed of a pair of vertically spaced impact bars 13 and 14 provided with rearwardly curved end portions 15 which are secured to the support members 11 as by means of eyelets 16 and 17 registering with the eyelets 19 provided upon the extremities of the support members 11. For pivotally securing these eyelets together there is provided a suitable pin or bolt 20. The bumper is secured to the frame of an automobile by suitable means such as brackets 22 to which the support members 11 are secured by means of clamps 23.

For reinforcing the intermediate portion of the impact member 10 there are provided a pair of truss members 26 which are inclined to the impact member 10 and have their outer ends secured to said impact member and their inner ends secured to the support members 11. As one feature of this invention the truss members 26 are formed as continuations of the support members 11, in practice only two pieces of bar material being employed as shown for forming both the support members and the truss members. The outer ends of truss members 26 are secured to the impact member 10 by suitable means such as clamps 27, a bolt 33 extending through the clamps and truss members.

At the point where the truss members 26 cross each other they are preferably retained in interlocking relationship. Thus as shown in Figs. 3 and 4 these members are oppositely notched as at 46 and 47 so that they may fit into each other as shown in Fig. 3. For retaining the truss members in this interlocking engagement there is preferably provided a clamp 49 which has been shown as being in the form of a block provided with four prongs adapted to fit over the intersecting bars, two of the prongs being secured together by suitable means such as a bolt 50.

It will be obvious that a bumper constructed in this manner will have many advantages not only from the standpoint of strength but also because it affords a bumper which may readily be manufactured in large quantities. The two bars from which are constructed the support and truss members need not be bent at acute angles except at their ends to form the eyelets 19. Furthermore they may be readily notched by suitable machinery to form the interlocking engagement.

I claim:

1. An automobile bumper comprising impact and support members, connected together adjacent their ends, said support members being formed of two separate bars having their inner ends crossed and secured at their extremities to said impact member.

2. An automobile bumper comprising an impact member, and a pair of support members secured to said impact member, said support members being crossed at a point intermediate the ends of the bumper and extended therefrom into contact with the impact member.

3. An automobile bumper comprising an impact member, and a pair of support members pivotally secured to the impact member adjacent the ends thereof, said support members being extended inwardly and crossed at a point spaced rearwardly of said impact member, the extremities of said extensions being secured at spaced points to the impact member.

4. An automobile bumper comprising an impact member, and a pair of separate support bars secured to said impact member, said support bars being extended inwardly and crossed at a point spaced inwardly of the impact member, the extremities of said extensions being secured at spaced points to the impact member.

5. An automobile bumper comprising an impact member, a pair of separate support bars secured to said impact member, said support bars being extended inwardly and crossed at a point spaced inwardly of the impact member, the extremities of said extensions being secured at spaced points to the impact member and means for locking said bars together at the point of crossing.

6. An automobile bumper comprising an impact member and support members, said support members being formed of bar material and extended inwardly and crossed at a point spaced rearwardly of the impact member, the ends of said extensions being in contact with the impact member, said support members at the point of crossing being oppositely slotted to form an interlocking engagement.

In testimony whereof, I have hereunto set my hand.

FRANK J. LAHER